C. WENDELL.
CREAM SKIMMER.
APPLICATION FILED APR. 13, 1916.
1,286,461.
Patented Dec. 3, 1918.
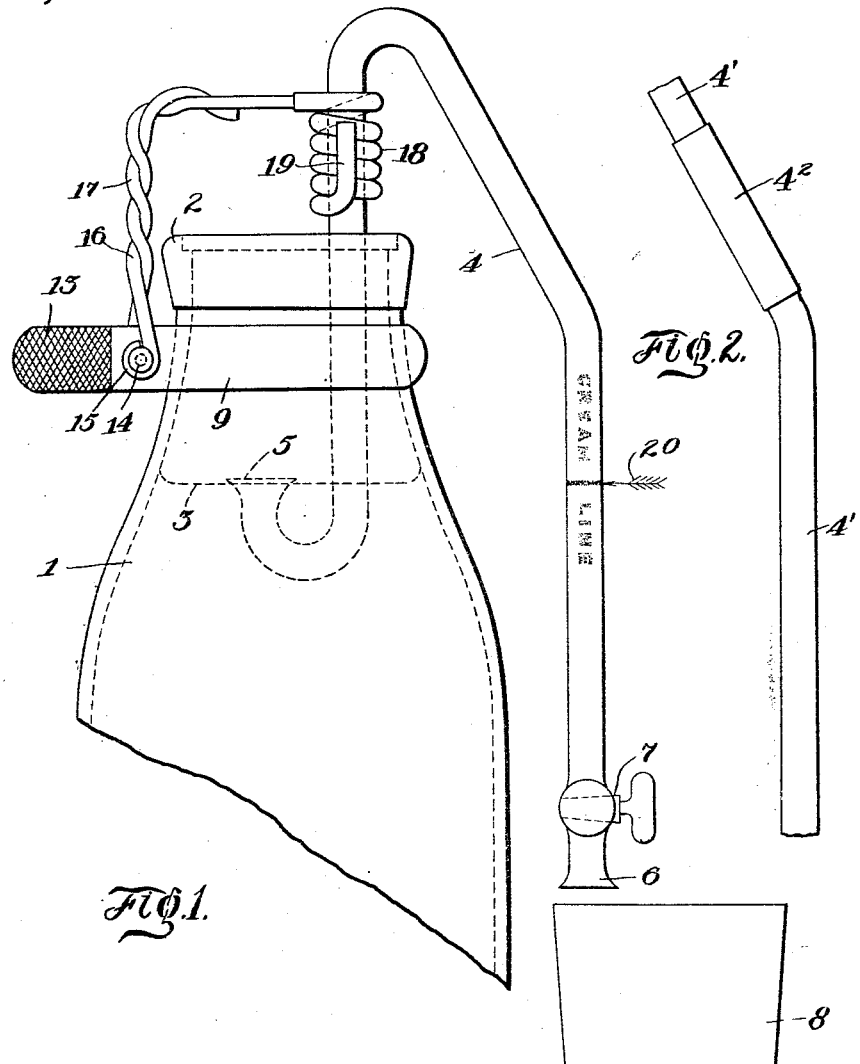
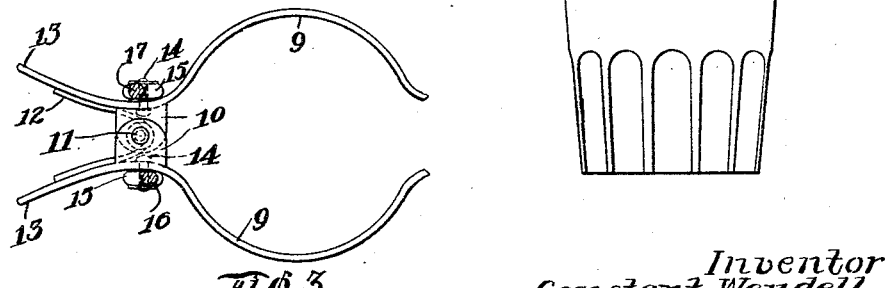
Inventor
Constant Wendell
By *Ellis Spear*
Attorney

UNITED STATES PATENT OFFICE.

CONSTANT WENDELL, OF JAMAICA PLAIN, MASSACHUSETTS.

CREAM-SKIMMER.

1,286,461.  Specification of Letters Patent.  Patented Dec. 3, 1918.

Application filed April 13, 1916. Serial No. 90,955.

*To all whom it may concern:*

Be it known that I, CONSTANT WENDELL, a citizen of the United States, residing at Jamaica Plain, county of Suffolk, Commonwealth of Massachusetts, have invented certain new and useful Improvements in Cream-Skimmers, of which the following is a specification.

This invention relates to devices for skimming the cream from milk, and has for its chief object to provide a simple and inexpensive article adapted to be detachably clamped to a milk bottle or other container and by a simple manipulation thereof, quickly draw off the cream content.

Another object of the invention is to provide a simple and effective clamp for variably positioning the device upon the bottle or other container, and to provide for indicating the cream level externally of the bottle or other container.

These and various other features which will appear more particularly hereinafter are secured in the device of the present invention, the construction and operation of which, together with a preferred embodiment thereof, is fully disclosed in the accompanying specification and drawings, throughout which like reference characters are correspondingly applied, and in the drawings, Figure 1 is an elevation of a device in accordance with my invention in position for use.

Fig. 2 is a partial elevation of a modification, and

Fig. 3 is a plan section of a preferred form of clamp.

I have illustrated my device in its application to a milk bottle 1 of conventional form having a shouldered mouth 2. The milk level within the bottle is indicated by the dotted line 3 and the cream is above this line.

In one form of my invention illustrated in Fig. 1 the means for drawing off the cream consists of a glass or other suitable siphon tube 4 having an upturned flaring intake end 5 adapted to be positioned within the bottle slightly above the milk line 3 and a discharge end 6 controlled by a suitable shut-off 7 and adapted to siphon the cream into a glass or other receptacle 8 arranged beneath said discharge end. The tube at a suitable point above the discharge end thereof is preferably marked with a transverse line, indicated by the arrow 20, Fig. 1, to register with the bottom of the cream level in the container.

In the form of my invention illustrated in Fig. 2, the siphon tube is formed in two sections 4'—4' which are flexibly connected by a suitable rubber or other coupling 4² to permit the lower section to be swung upwardly at the coupling in starting the siphoning action.

In both forms, the intake end of the siphon tube is adapted to be adjustably positioned within the bottle according to the cream level. A preferred construction for so mounting the tube comprises a spring clamp disposed for adjustable engagement with the bottle externally thereof and below the mouth. The clamp consists of two appropriately curved connected spring jaws 9 adapted to embrace opposite sides of the bottle and provided between their ends with oppositely arranged overlapping ears 10 through which a rivet or other suitable fastening 11 is disposed to connect the jaws at this point. The jaws are normally urged toward each other by a blade or other suitable spring 12, here shown as bent around the fastening 11 and having its free ends bearing against the diverging free ends 13 of the jaws 9. The ends 13 constitute finger operating portions to expand the clamp and may be conveniently knurled or otherwise roughened, as shown in Fig. 1, to enable them to be readily grasped.

Set through the jaws 9 preferably opposite to the fastening 11 thereof are suitable rivets or other fastenings 14 over which, and between their heads and the jaws 9, the bent ends 15 of a pair of wire or other suitable arms 16 and 17 are hooked. One arm 16 is shorter than the other arm 17, but both arms above the clamp, meet and are twisted upon each other, extending as a vertically disposed support. The longer arm 17, at a suitable height above the clamp is bent laterally and extends above and transversely to the mouth of the bottle as a horizontally disposed support which when the tube and clamp are assembled is adapted to be bent into a vertically disposed coil 18 through which one portion of the siphon extends and is clamped. The terminus 19 of the coil is bent vertically back upon itself providing an operating portion whereby the coil may be opened and closed to grip and release the tube. The shorter arm 16 terminates substantially at the lateral bend of the arm 17 and is twisted over said arm.

In applying the clamp, the finger portions 13 thereof are gripped and pressed toward each other to separate the jaws 9 and permit them to be engaged about the bottle at the desired point. The free end of the arm 17 is then bent around the tube 4 to form the coil 18 shown in Fig. 2, whereupon the tube is inserted into the bottle to position the upturned intake end 5 thereof within the bottle and the discharge end 6 downwardly and externally thereof as shown in Fig. 1. The tube is adjusted vertically in the resilient holder 18, by spreading open the coil by means of the finger piece 19, until its intake 5 is disposed just above the milk level of the bottle, whereupon the coil 18 is released and its inherent resiliency causes it to return to clamping position to firmly grip the tube and hold it in position.

The siphoning action is started before the tube is clamped within the bottle. This may conveniently be done by filling the tube with water. The shut-off 7 is first opened and the tube inverted and filled with water from the end 6 until the water runs out. After the tube has been filled the shut-off is closed and the tube inserted into the bottle as shown in Fig. 1, and adjusted to position as described above. The shut-off may then be opened to allow the contained water in the tube to drain off. This starts the siphoning action and as soon as all the water in the tube has drained out, the cream begins to flow, whereupon the receptacle 8 is placed under the discharge end 6 to catch the cream.

In the form of my invention shown in Fig. 2, the tube is clamped in the manner described and the siphoning action started by inverting and filling the lower section 4' with water while pinching the coupling 4² between the fingers to prevent further passage of the water. When the tube is properly adjusted within the bottle, the lower section is again reversed and the coupling released, permitting the water to drain off and the cream to be siphoned.

Various other modifications in the form and construction of my invention may obviously be resorted to within the limits of the appended claims.

I claim:

1. In a device for use with a receptacle containing a liquid to be siphoned, a siphon element having an intake end adapted to be submerged in the liquid to be siphoned and having a discharge end disposed externally of the receptacle, a member adapted for clamping engagement with the receptacle, a resilient coil carried by said member and adapted for clamping engagement with the siphon element, one end of said coil formed as a finger operable portion whereby the coil may be opened to permit the siphon element to be adjusted longitudinally therein.

2. In a device for use with a receptacle containing a liquid to be siphoned, a siphon element having an intake end adapted to be submerged in the liquid to be siphoned and having a discharge end disposed externally of the receptacle, a member adapted for clamping engagement with the receptacle, a resilient coil carried by said member and adapted for clamping engagement with the siphon element and having a finger-operable portion for opening the coil to permit the siphon element to be adjusted therein, the coil adapted to automatically close by its inherent resiliency to positively clamp the siphon element at the desired adjustment.

3. In a device for use with a receptacle containing a liquid to be siphoned, a siphon element having an intake end adapted to be submerged in the liquid to be siphoned and having a discharge end disposed externally of the receptacle, a pair of pivotally connected spring clamping jaws adapted to engage the receptacle on opposite external sides, and a member extending from one of said jaws and formed as a superposed series of resilient turns adapted to adjustably clamp the siphon element between its ends.

4. In a device for use with a receptacle containing a liquid to be siphoned, a siphon element having an intake end adapted to be submerged in the liquid to be siphoned and having a discharge end disposed externally of the receptacle, a pair of pivotally connected spring clamping jaws adapted to engage the receptacle on opposite external sides thereof, and a member extending vertically from one of said jaws and then laterally and terminating in a vertically disposed resilient coil adapted to adjustably clamp the siphon element between its ends, said coil having one end bent to provide a finger-operating portion whereby the coil may be opened to permit the siphon element to slide therein, and the inherent resiliency of the coil automatically closing the coil when said finger portion is released to positively clamp the siphon element at the desired adjustment.

5. A clamp for a siphon tube comprising a pair of pivotally connected spring clamping jaws adapted to engage a receptacle on opposite external sides thereof, said jaws extended rearwardly to provide opposed finger-operating portions, and a member fastened to one of said jaws and formed as a resilient coil in the form of a superposed series of resilient turns disposed over the receptacle and through which the siphon tube extends, said coil operable to permit the tube to be adjusted longitudinally therein and automatically closing to frictionally clamp the tube at the desired adjustment.

6. In a device for use with a receptacle containing a liquid to be siphoned, a siphon element having an intake end adapted to be submerged in the liquid to be siphoned and having a discharge end disposed externally of the receptacle, a receptacle clamp, and a resilient siphon clamp supported upon said receptacle clamp and having a finger operable portion whereby the clamp may be opened to permit the siphon element to be adjusted therein, the inherent resiliency of the siphon clamp automatically closing the same when said finger operable portion is released to positively clamp the siphon element at the desired adjustment.

In testimony whereof I affix my signature in presence of two witnesses.

CONSTANT WENDELL.

Witnesses:
GEORGE B. RAWLINGS,
VICTORIA LOWDEN.

Copies of this patent may be obtained for five cents each, by addressing the "Commissioner of Patents, Washington, D. C."